3,466,356
METHOD AND APPARATUS FOR MAKING
PLASTIC FILM
Frank A. Carlson, Jr., Pittsford, N.Y., and Walter E.
Zavitz, Greenville, S.C., assignors to Celanese Corporation, New York, N.Y., a corporation of Delaware
Filed Oct. 27, 1966, Ser. No. 590,089
Int. Cl. B29c 17/04; B29d 7/24, 23/04
U.S. Cl. 264—95                                        9 Claims

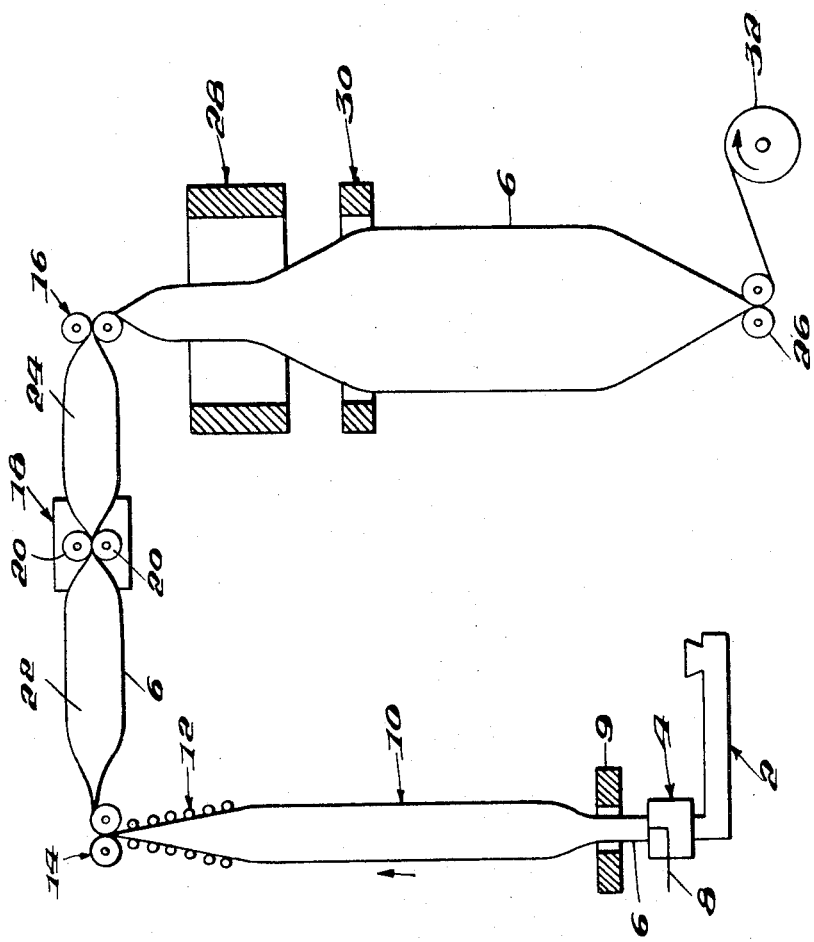

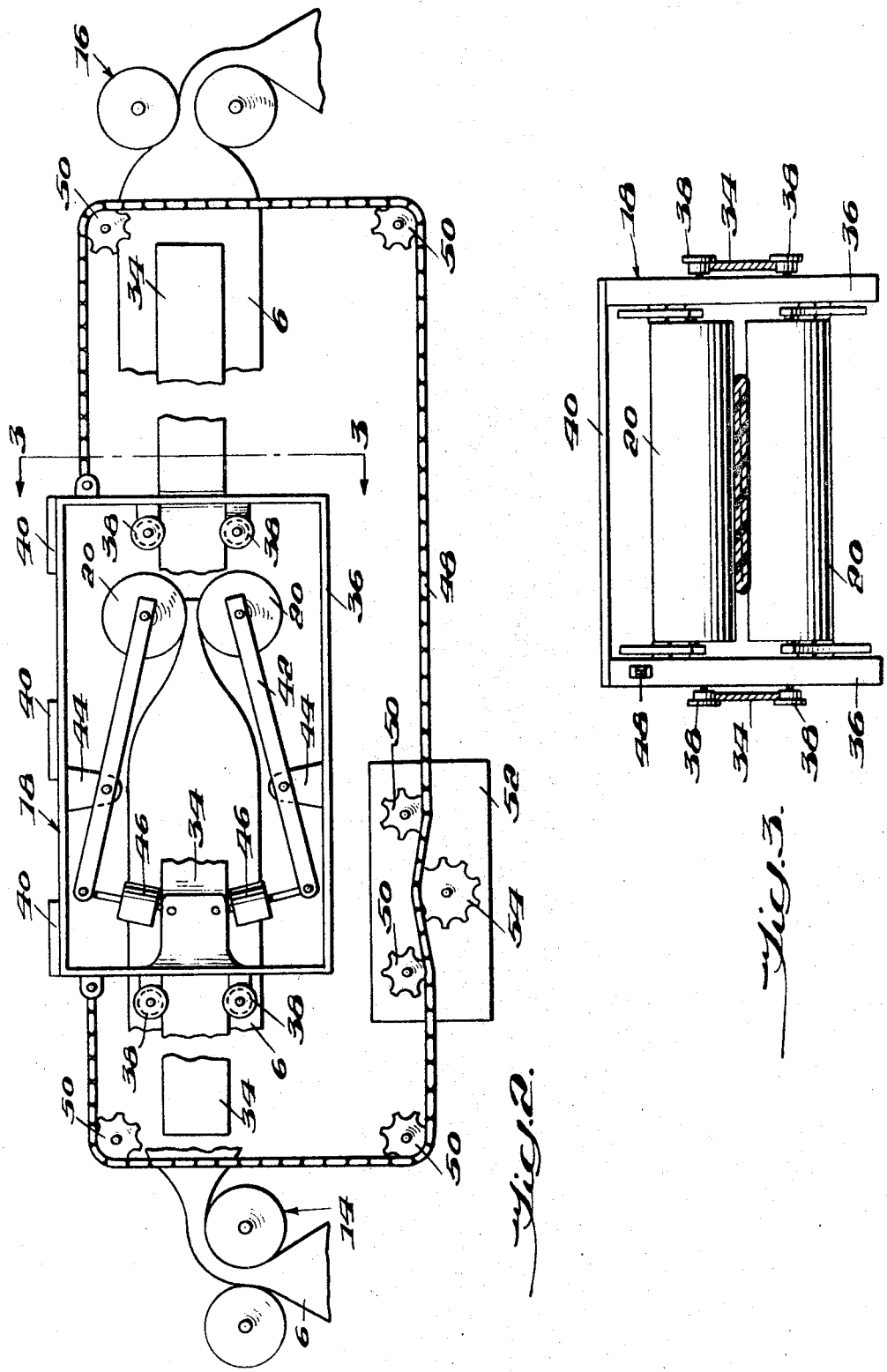

ABSTRACT OF THE DISCLOSURE

A method for stretching a tubular thermoplastic film is disclosed and claimed which consists of forming a bubble of gas in a tubular film and by means of a sliding pair of pinch rollers, increasing the gas pressure within the bubble by reducing the volume of the bubble and subsequently allowing the gas to leak into a second bubble, called the orientation section. The products produced by the claimed process have a well orientated crystalline structure and may be produced in sheet form and accordingly have utility in many sheeting applications.

---

This invention relates to forming plastic film and more particularly to methods and apparatus for orienting blown films of thermoplastic material.

In a conventional film forming process, a continuous tube of molten thermoplastic material is extruded from a die and air is injected through the die into the interior of the tube. A pair of pinch rolls is spaced along the length of the extruded tube and air is trapped in the tube between the pinch rolls and the extruding die. The soft plastic tube is stretched to some extent by the air pressure in the initial portion of the tube, which is known as the first bubble, and then in passing between the pinch rolls, the tube is collapsed. The continuously advancing tube passes between a second pair of pinch rolls and the portion of the tube between the first and second pairs of rolls is again expanded to form a second bubble by trapping air between the two pairs of pinch rolls. The air may be injected into the second bubble through a needle which pierces the wall of the tube, or by other conventional means. The pressure of the air in the second bubble is sufficiently great to cause the tube to expand radially to such an extent that the tube wall is cold stretched, thus orienting the crystalline structure of the tube both circumferentially and axially. When the tube is subsequently slit longiutdinally and spread flat, the resulting sheet is substantially equaly stretched along both axes in the plane of the sheet and has substantially the same strength properties in both directions.

The gas pressure in the second bubble should be maintained relatively constant so that the degree of stretching of the tube is uniform along the length of the tube. Although air is injected into the second bubble when the process starts, it is usually necessary to supply air to the second bubble from time to time after the process has started, due to leakage between the pinch rolls. However, it is impractical to inject air through the wall of the tube while it is advancing, without disrupting the tube stretching process.

Accordingly, it is an object of this invention to provide a method and apparatus for maintaining a substantially uniform fluid pressure in plastic tubing that is being stretched in a continuous process.

It is a further object of this invention to provide a method and apparauts for supplying air or other fluid to the interior of the second bubble without piercing the wall of the tube that is being stretched.

It is a still further object of this invention to provide an efficient method and apparatus for stretching and orienting blown plastic film.

These objects are accomplished in accordance with a preferred embodiment of the invention by extruding a tube of plastic material through a die and cooling the tube sufficiently for it to be self sustaining. Air is injected into the interior of the tube as it emerges from the die to inflate the tube to form a first bubble. Pinch rolls and a collapsing frame are provided at the end of the first bubble section. A second pair of stationary pinch rolls are spaced along the direction of movement of the tube from the first set of pinch rolls to form an intermediate section. A third set of pinch rolls is spaced from the second set to form an orientation section. The orientation section or second bubble includes an oven for heating the tube to cause it to expand radially and longitudinally under the pressure of the air in the tube. After being heated, the tube passes through a cooling ring which cools the tube after it has been stretched to the desired degree.

The intermediate section between the first and second bubbles is in the form of a peristaltic pump. Leakage of compressed air from the first bubble into the intermediate section as the tube passes between the first pair of rolls causes the intermediate section to be inflated. The intermediate section of expanded tube is compressed by a pair of travelling rolls which are movable longitudinally of the tube. While the travelling rolls are traversing toward the second bubble, the pressure in the intermediate section of the tube ahead of the travelling rolls is increased and air leaks from the intermeidate section between the second pair of pinch rolls into the second bubble.

The travelling rolls are displaced longitudinally along with movement of the tube, and when the travelling rolls reach the second pair of rolls, the travelling rolls separate to release the tube. The travelling rolls rapidly return to a position adjacent the first set of rolls and again move into engagement with the tube for the next stroke of the pump. The peristaltic pump permits low pressure air from the first bubble to be transferred into the second bubble at a higher pressure, thereby expanding the tube more rapidly and to a greater degree, without requiring the introduction of additional air or gas to the interior of the second bubble from an external source.

This preferred embodiment is illustrated in the accompanying drawings in which:

FIG. 1 is a schematic view of the apparatus of this invention;

FIG. 2 is a side elevational view of the pump and traversing mechanism; and

FIG. 3 is a cross sectional view of the traversing mechanism along the line 3—3 in FIG. 2.

Referring to FIG. 1, a thermoplastic material is heated in an extruder 2 and extruded through a tubing die 4 to form a continuous tube 6 which is substantially circular in cross section as it emerges from the die.

The tube 6 may be formed of any suitable organic thermoplastic material that can be extruded to produce a film in tubular form. Such materials include, for example, polyolefins, linear super polyamides, certain vinyl polymers and copolymers, such as polyvinyl chloride, polystyrene, polyvinylidene chloride and vinyl chloride/vinylidene chloride copolymers and cellulose derivatives such as cellulose acetate.

Air is injected through a conduit 8 in the tubing die 4 into the interior of the tube 6. Immediately above the die 4 is an air ring 9 which cools the tube 6 as it passes through the ring in accordance with conventional practice. The air pressure in the tube 6 is greater than atmospheric pressure and causes the tube to expand to approximately twice the tube diameter at the tubing die.

Expansion of the tube causes the thickness of the extruded tube to decrease. This portion of the process is known as the first bubble or blown tubing section and is designated in FIG. 1 by the numeral 10. The tube 6 then passes through a collapsing frame 12 which merely consists of a plurality of parallel rollers in which the spacing between the rollers gradually decreases as the tube approaches a pair of driven pinch rolls 14.

A second pair of driven pinch rolls 16 is spaced longitudinally of the tube 6 from the first set of rolls 14. The portion of the process between these pairs of pinch rolls 14 and 16 is the peristaltic pump. Each of the pairs of pinch rolls 14 and 16 has provision for permitting the air that is trapped in the tube to leak into the next succeeding section. One roll of each pair of rolls 14 and 16, for example, may have a circumferential groove midway along the length of the rolls which cooperates with a similar groove on the opposite roll to relieve the roll pressure acting on the tube sufficiently to permit air to flow through the space between the pinch rolls.

In the pump section, there is a carriage 18 which moves longitudinally of the tube 6. The carriage 18 includes a pair of rolls 20 which pinch together the tube 6 to form a low pressure bubble 22 and a high pressure bubble 24. The carriage 18 includes a mechanism for advancing the rolls along the direction of movement of the tube 6, separating the rolls 20 to release the tube 6 when the carriage approaches the rolls 16, and then rapidly returning the carriage to a position adjacent the first set of rolls 14.

Since air leaks between the rolls 14 into the tube portion in the pump section, the pressure in the interior of the tube would normally be approximately the same as the pressure in the blown tubing section 10. The rolls 20 of the traversing carriage 18 do not permit leakage of air between the high pressure bubble 24 and the low pressure bubble 22. Therefore, as the carriage 18 and the tube 6 move toward the right, as viewed in FIG. 1, the air pressure in the bubble 24 increases, provided that the volume of the bubble 24 is decreased by the rolls 20 at a rate greater than that at which the air leaks between the rolls 16 into the succeeding section of the tube 6. At the same time, the pressure in the low pressure bubble 22 decreases to the extent that the movement of the carriage 18 increases the volume of the bubble 22 at a greater rate than the air flows from the first bubble 10 into the low pressure bubble 22. Preferably, the pressure in the high pressure bubble 24 is substantially greater than the pressure in the first bubble 10.

The succeeding section of tubing 6 is pinched between the rolls 16 and a third set of rolls 26. This portion of the process is known as the orientation section or second bubble. In this section, the tube 6 is heated by an oven 28 which surrounds the tube 6. The oven heats the tube to a temperature which will allow stretching by the internal pressure in the tube and while this stretching takes place, the molecules in the tube wall are oriented both circumferentially and axially. The pinch rolls 26 are driven at a slightly greater rate than the rolls 16 in order to apply axial tension to the walls of the tube. A cooling ring 30 is spaced downwardly from the oven 28 to cool the tube below the orientation temperature. The tube 6 is then collapsed as it passes between the pinch rolls 26 and it is subsequently wound on a drum 32. The tube 6 may be slit longitudinally after passing between the rolls 26 and unfolded to form a biaxially oriented sheet.

The carriage 18 in which the rolls 20 are supported is shown in FIGS. 2 and 3. The carriage 18 is mounted for movement along a pair of guide rails 34 which are rigidly supported on opposite sides of the tube 6. The rails 34 are substantially in alignment with the central axis of the tube portion that extends between the rolls 14 and 16. The carriage includes side frame members 36 on which are mounted a pair of wheels 38 at the front and rear of each frame 36. The wheels 38 support the carriage on the rails 34 and maintain the carriage 18 in substantial alignment with the pinch rolls 14 and 16 as the carriage moves from one end to the other of the pump section. The side frames 36 are secured together by a plurality of cross bars 40 to form a rigid carriage frame.

The rolls 20 are each supported between a pair of levers 42 which are individually mounted in the side frame 36. Each lever 42 is mounted for swinging movement on a bracket 44, as shown in FIG. 2. The end of each lever 42 is connected with the frame 36 by a fluid actuator 46. Preferably, each actuator 46 is double acting, but as an alternative, a spring may be provided for separating the rolls 20 when the fluid pressure in the cylinder 46 is released. Of course, the air pressure in the interior of the tube 6 tends to cause the rolls 22 to separate and this pressure may be sufficient to allow air to flow from the low pressure to the high pressure section while the carriage is moving during the return stroke.

Longitudinal movement of the carriage 18 is effected by a sprocket chain 48 which is attached to the forward end of one of the side frames 36 and the opposite end of the sprocket chain 48 is attached to the rear end of the frame 36. The chain passes over idler pulleys 50 and a motor means 52, such as a reversible electric motor is mounted under the rails 34 for displacing the chain 48 in a longitudinal direction. The motor means 52 has a sprocket wheel 54 and the chain 48 passes over the sprocket wheel and may be driven in either direction by the motor means 52. Preferably, the motor means includes a variable speed control for adjusting the rate of advance and return movement of the carriage 18.

In operation, a tube 6 is extruded from the die 4 and air is injected through the conduit 8 into the interior of the tube 6. As the tube moves progressively away from the die 4, it is cooled by the ring 9 and is inflated by the air pressure in the interior of the tube to form a first bubble 10. As the tube advances toward the first set of pinch rollers 14, it is folded into a flat, double sheet by the collapsing frame 12. The tube 6 then passes from the pinch rolls 14 to the second set of pinch rolls 16. The air pressure in the tube 6 is increased in the peristaltic pump section between the rolls 14 and 16.

Initially, the carriage 18 is positioned adjacent the pinch rolls 14 and movement of the carriage 18 along the rails 34 is controlled by the motor means 52. The rate of movement of the carriage is adjusted to increase the pressure in the bubble 24 to the pressure required in the orientation section. The rate of movement of the carriage 18 may be greater or less than the rate at which the tube 6 advances. The rolls 20 on the carriage are displaced toward each other by the actuators 46 to form the low pressure bubble 22 and the high pressure bubble 24. When the piston in the respective actuators 46 is displaced outwardly, each lever 42 swings relative to the carriage frame 36 to move the rolls 20 toward each other. The fluid pressure in the actuators 46 urges the rolls toward each other to clamp the tube 6 tightly between the rolls 20. Motor means 52 rotates the sprocket wheel 54 in a counterclockwise direction, as shown in FIG. 2, while the rolls 20 are holding the tube 6 pinched together, and the chain 48 is displaced longitudinally by the wheel 54 to draw the carriage 18 along the rails 34. This causes the fluid pressure in the interior of the high pressure bubble 24 to increase, while the pressure in the low pressure bubble remains substantially the same, due to leakage of air between the pinch rolls 14. The high pressure air leaks through the pinch rolls 16 into the second bubble where orientation of the tube 6 takes place.

When the carriage 18 reaches the forward end of its stroke, that is when it is near the rolls 16, the actuators 46 are operated to swing the rolls 20 outwardly away from the tube 6. The direction of rotation of the sprocket wheel 54 is then reversed and the motor means 52 rapidly turns the wheel 54 in a clockwise direction to displace the carriage 18 rearwardly to a position adjacent the rolls 14. Conventional limit switches may be used for operating the motor means 52 and the actuators 46 at the opposite ends of its stroke. While the carriage 18 is moving rearwardly, there may be some leakage of air from the second bubble between the rolls 16 and into the pump section, but the grooves in the rolls 16 restrict the rate of leakage of air.

The fluid pressure developed in the interior of the high pressure section 24 is substantially greater than the pressure in the first bubble 10, but the tube 6 does not expand appreciably beyond the expansion of the first bubble, without heating. As the tube 6 passes through the oven 28, the tube is heated sufficiently to allow expansion under the high pressure air in the interior of the tube. The softening temperature of the tube 6 depends upon the particular material of the tube, but should be adjusted to produce an expansion of approximately six to twelve times the diameter of the tube as originally extruded at the die 4. The tube is immediately cooled by a ring 30 after longitudinal and circumferential stretching of the wall of the tube has been completed. The tube then passes between pinch rolls 26 which collapse the tube and the flattened tube is wound on a drum 32.

All of the air that is used both in the first and second bubbles is introduced through the tubing die and there is no need to use additional air in the second bubble. Furthermore, the tube does not need to be split after it emerges from the draw rolls 26 in order to introduce air into the second bubble through the rolls 26, as has been suggested in the prior art. Thus, the collapsed tube may remain in its folded condition for subsequent processing.

The conventional successive bubble film blowing technique requires a higher air pressure in the interior of the orientation bubble without disturbing the low pressure, blown tube bubble. The process of this invention, including the use of a peristaltic pump section produces a higher pressure gas in the orientation bubble in a continuous process which does not scratch the film or require frequent stopping of the process.

What is claimed is:

1. In a process for stretching an indeterminate length of longitudinally advancing, continuous tubular thermoplastic film by internal gas pressure confined between two pairs of pinch rolls in an orientation section of said tubular film, the first set of pinch rolls defining the beginning of said orientation section and the second set of pinch rolls defining the end of said orientation section, the improvement comprising the steps of:
   (a) forming a bubble of said gas in said tubular film adjacent said orientation section;
   (b) progressively reducing the volume of said gas bubble to increase the gas pressure in the bubble by means of travelling pinching rolls that form a pinched together film portion and travels in the direction of the film towards said first set of pinch rolls, said travelling pinch rolls having means to release the pinching rolls and again pinching together a second tubular film portion spaced from said first pinched together portion in a direction opposite the direction of advancing of said tubular film; and
   (c) conducting gas from said bubble into said orientation section by leaking means of said first set of pinch rolls.

2. The process according to claim 1 including introducing gas into said tubular film before said tubular film reaches said bubble.

3. The process according to claim 1 wherein the volume rate of flow of gas conducted to said orientation section is less than the rate at which the bubble volume is reduced.

4. The process of claim 1, wherein the leaking means includes slightly separating said first set of pinch rolls to permit restricted gas flow along the inside of said tubular film between said first set of pinch rolls into said orientation section.

5. The process according to claim 1 including advancing said tubular film substantially continuously.

6. In apparatus for orienting a continuous tubular film of indeterminate length by continuously forming said tubular film in a blown film section while conducting gas into said tubular film at a relatively low fluid pressure, and subsequently subjecting said tubular film to high internal fluid pressure while heated to expand said tubular film circumferentially and longitudinally in an orientation section, the improvement comprising: means for pumping said gas from said blown film section to said orientation section, said pump means including means for increasing the pressure of said gas from said low pressure to said high pressure.

7. The apparatus according to claim 6 wherein said pumping means includes means for pinching together said tubular film between said blown film section and said orientation section, and means for advancing said pinching means progressively along said tubular film to build up the gas pressure ahead of said pinching means.

8. Apparatus for stretching an indeterminate length of longitudinally advancing, continuous thermoplastic tubular film by internal gas pressure comprising:
   (a) first and second pairs of pinching rolls defining an orientation section therebetween, said pairs of pinching rolls restricting the flow of gas longitudinally through said tubular films into and out of said orientation section,
   (b) means for forming a bubble of said gas in said tubular film adjacent said orientation section,
   (c) slidably mounted pinching rolls, situated after said bubble forming means and before said orientation section, said slidably mounted pinching rolls forming a pinched together film portion and sliding in the direction of the film towards said orientation section decreasing the volume and increasing the gas pressure in said bubble as the pinching rolls approach said orientation section, said slidably mounted pinching rolls having means to release the pinching rolls and again pinching together a second bubble spaced from the first bubble in a direction opposite the direction of advancing tubular film, and
   (d) means for conducting gas from said bubble into said orientation section.

9. The apparatus according to claim 8 wherein said first pair of rolls each has a circumferential groove therein, whereby gas flows longitudinally along the inside of said tubular film between said rolls from said bubble to said orientation section.

References Cited

UNITED STATES PATENTS

| 2,688,773 | 9/1954 | McIntire | 264—95 |
| 2,862,234 | 12/1958 | Gerber. | |
| 3,166,616 | 1/1965 | Bild et al. | 264—95 |

ROBERT F. WHITE, Primary Examiner

J. R. THURLOW, Assistant Examiner

U.S. Cl. X.R.

18—14; 264—209, 210